UNITED STATES PATENT OFFICE.

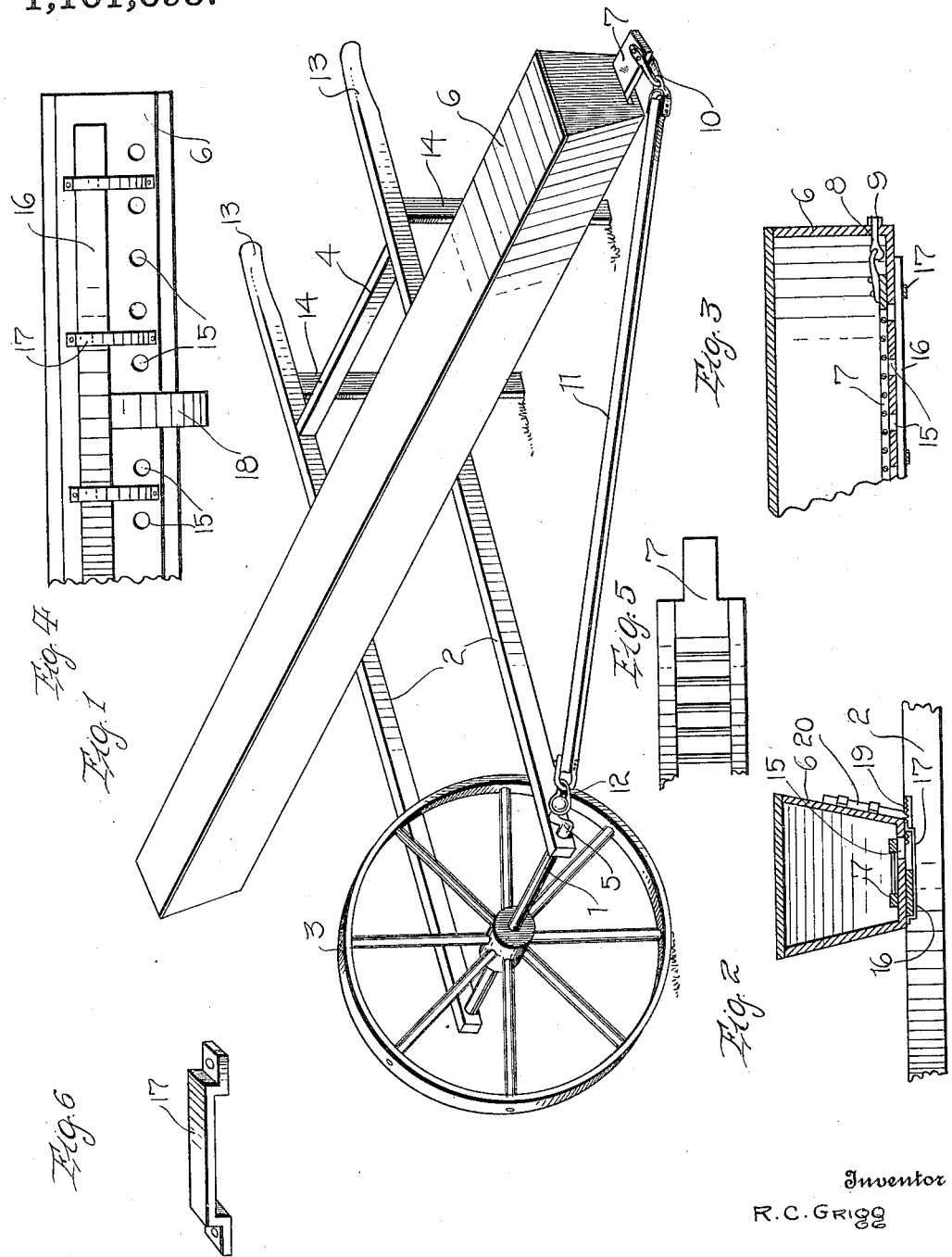

ROBERT C. GRIGG, OF KINGSTON, ARKANSAS.

GRAIN-DRILL.

1,101,695.   Specification of Letters Patent.   Patented June 30, 1914.

Application filed February 7, 1914. Serial No. 817,300.

*To all whom it may concern:*

Be it known that I, ROBERT C. GRIGG, a citizen of the United States, residing at Kingston, in the county of Madison and State of Arkansas, have invented certain new and useful Improvements in Grain-Drills, of which the following is a specification, reference being had to the accompanying drawings.

This invention relates to new and useful improvements in seeders and planters and more particularly to devices known as grain drills, and the primary object of the invention is to provide a device of this character which is an improvement over devices of this type now in use.

A further object of the invention resides in providing an improved shaking mechanism in connection with the hopper for the distribution of the seed, and a still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter described and claimed.

In the accompanying drawing forming a part of this application, Figure 1 is a perspective view of the machine; Fig. 2 is a vertical transverse section through the hopper; Fig. 3 is a fragmentary longitudinal section through the hopper and shaking mechanism therein; Fig. 4 is a fragmentary bottom plan view of the hopper; Fig. 5 is a fragmentary plan view of the distributing member removed; and Fig. 6 is a perspective view of one of the keepers for the slide member on the bottom of the hopper.

In describing my invention, I shall refer to the drawing in which similar reference characters designate corresponding parts throughout the several views and in which 1 indicates an axle rotatably mounted in the forward ends of a pair of arms 2 and having secured thereon a driving and supporting wheel 3. The arms are braced by an arm 4, and one end of the axle is provided with a crank 5, the purpose of which will be hereinafter and more particularly described.

Mounted on the arms 2, and projecting laterally therefrom, is an elongated hopper 6, arranged within which is a shaking bar or distributing member 7, one end of which has linked connection with an eye bolt 8 which extends through one end of the hopper 6. The eye of this bolt 8 is disposed within the hopper and its outer end is engaged by a nut 9 by which requisite adjustments of the bar relative to the hopper may be effected. The other end of the bar 7 projects through an opening in one end of the hopper 6 and has loosely connected therewith a linking arm 10. Loosely connected with this arm 10 is one end of a pitman 11 the other end of which is connected with the axle crank 5 by a linking member 12.

From this construction it will be seen that as the axle 1 is rotated, and with it the crank 5, the members 10, 11 and 12 will be reciprocated and thus oscillate the bar 7. The bottom of the hopper is provided throughout its length with a plurality of openings 15, and by the oscillation of the member 7, it will be seen that the contents of the hopper will be distributed through these openings to the ground as the device is propelled.

The free ends of the arms 2 are designed to form handles 13, and secured on the arms adjacent to the handles are supporting standards 14 which are adapted to rest upon the ground when the device is not in use.

I have provided a means for regulating the amount of material to be distributed from the openings 15 in the hopper, and to this end, a slide member 16 is provided, which is disposed on the under face of the hopper 6 and extends longitudinally for the greater length of the latter, and is mounted in a plurality of transversely disposed keepers 17 also secured to the under face of the hopper 6. A laterally extending arm 18 projects from the slide 16 rearwardly of the hopper and has its upper face provided with teeth 19. A locking dog 20 is slidably mounted in keepers on the rear face of the hopper and has its lower end adapted for engagement with the teeth 19 whereby the slide 16 may be retained in any desired adjustment according to the quantity of material to be distributed.

From the foregoing description of the construction of my improved device, the operation thereof will be readily understood, it being seen that I have provided a device which is simple in construction, inexpensive to manufacture, and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:

A device of the class described comprising a frame, an axle rotatably mounted in one end thereof and carrying a crank, a driving and supporting wheel mounted on the axle, a hopper bridging the frame and projecting beyond the sides thereof, a bar mounted in the bottom of the hopper and extending longitudinally of the same, the bar having one end pivotally connected with one end of the hopper and its other end loosely projected through the other end thereof, linking means between the bar and the axle crank, and a transversely adjustable slide arranged beneath the hopper for regulating the escape of material.

In testimony whereof I hereunto affix my signature in the presence of two witnesses.

ROBERT C. GRIGG.

Witnesses:
MILONS EOFF,
WALTER GRIGG.

---

Copies of this patent may be obtained for five cents each, by addressing the "Commissioner of Patents, Washington, D. C."